United States Patent
Podgorny et al.

(10) Patent No.: US 11,138,382 B2
(45) Date of Patent: Oct. 5, 2021

(54) NEURAL NETWORK SYSTEM FOR TEXT CLASSIFICATION

(71) Applicant: Intuit Inc., Mountain View, CA (US)

(72) Inventors: Igor A. Podgorny, San Diego, CA (US); Vitor R. Carvalho, San Diego, CA (US); Sparsh Gupta, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 261 days.

(21) Appl. No.: 16/526,626

(22) Filed: Jul. 30, 2019

(65) Prior Publication Data

US 2021/0034707 A1 Feb. 4, 2021

(51) Int. Cl.
*G06F 40/30* (2020.01)
*G06N 3/04* (2006.01)
*G06N 3/08* (2006.01)

(52) U.S. Cl.
CPC ........... *G06F 40/30* (2020.01); *G06N 3/0445* (2013.01); *G06N 3/0454* (2013.01); *G06N 3/08* (2013.01)

(58) Field of Classification Search
CPC .... G06F 17/2785; G06N 3/08; G06N 3/0445; G06N 3/0454
See application file for complete search history.

(56) References Cited

U.S. PATENT DOCUMENTS

| | | | |
|---|---|---|---|
| 7,865,829 B1 | 1/2011 | Goldfield et al. | |
| 9,923,931 B1* | 3/2018 | Wagster | H04L 63/30 |
| 2002/0107842 A1 | 8/2002 | Biebesheimer et al. | |
| 2007/0061301 A1* | 3/2007 | Ramer | G06F 16/248 |
| 2007/0061335 A1* | 3/2007 | Ramer | G10L 15/26 |
| 2007/0260635 A1* | 11/2007 | Ramer | H04L 67/2823 |
| 2010/0023514 A1* | 1/2010 | Parikh | G06F 40/242 |
| | | | 707/E17.001 |
| 2011/0270828 A1 | 11/2011 | Varma et al. | |
| 2014/0219563 A1* | 8/2014 | Rodriguez-Serrano | G06K 9/18 |
| | | | 382/182 |
| 2015/0310862 A1* | 10/2015 | Dauphin | G06F 40/30 |
| | | | 704/257 |

(Continued)

OTHER PUBLICATIONS

International Search Report dated Sep. 9, 2020 issued in International Application No. PCT/US2020/038022 (5 pages).

(Continued)

*Primary Examiner* — Kevin Ky
(74) *Attorney, Agent, or Firm* — DLA Piper LLP (US)

(57) ABSTRACT

A computer-implemented method is provided to perform text classification with a neural network system. The method includes providing a computing device to receive input datasets including user input question text and feed the datasets to the neural network system. The neural network system includes one or more neural networks configured to extract and concatenate character-based features, word-based features from the question datasets and clickstream embeddings of clickstream data to form a representation vector indicative of the question text and user behavior. A representation vector is fed into fully connected layers of a feed-forward network. The feed-forward network is configured to predict a first class and a second class associated with respective user input questions based on the representation vector.

20 Claims, 7 Drawing Sheets

(56) References Cited

U.S. PATENT DOCUMENTS

| | | | |
|---|---|---|---|
| 2018/0025010 A1* | 1/2018 | Ramer | H04N 21/251 |
| | | | 707/727 |
| 2018/0157664 A1* | 6/2018 | Howell | G06N 20/10 |
| 2019/0034484 A1* | 1/2019 | Das | G06N 3/08 |
| 2019/0122651 A1* | 4/2019 | Arik | G10L 13/08 |
| 2019/0138606 A1* | 5/2019 | Tu | G06F 40/49 |
| 2019/0188295 A1* | 6/2019 | Sirotkovic | G06N 3/0445 |
| 2019/0213480 A1* | 7/2019 | Lim | G06F 40/10 |
| 2019/0236132 A1* | 8/2019 | Zhu | G06N 20/00 |
| 2020/0005503 A1* | 1/2020 | He | G06N 3/08 |
| 2020/0050667 A1* | 2/2020 | Lin | G06F 40/279 |

OTHER PUBLICATIONS

Written Opinion dated Sep. 9, 2020 issued in International Application No. PCT/US2020/038022 (7 pages).
Zhang et al., "Generic Intent Representation in Web Search", Arxiv.org, arXiv:1907.10710v1[cs.IR], Cornell University Library, Jul. 24, 2019 (10 pages).

* cited by examiner

NEURAL NETWORK SYSTEM FOR TEXT CLASSIFICATION

The present disclosure relates to natural language processing for text classification utilizing a deep learning neural network architecture.

DETAILED DESCRIPTION

Figure 1:
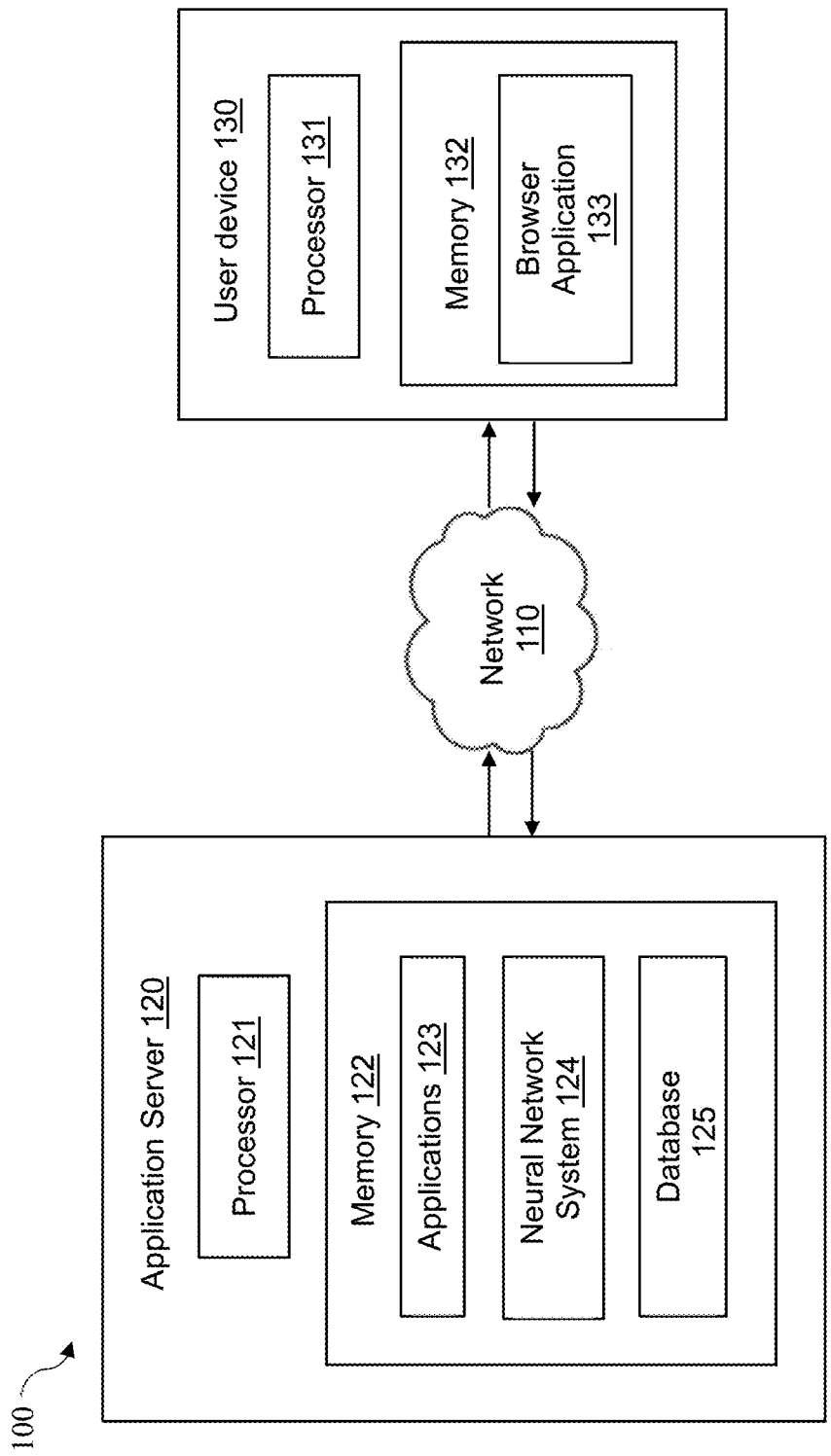
FIG. 1 is an example system according to some embodiments of the present disclosure.

Embodiments described herein may be configured to implement a neural network system with deep learning models to perform natural language text classification. The present disclosure may be utilized in managing questions and answers based on a neural network system architecture.

When users access a Community Question Answering (CQA) site or system hosted on a commercial website (e.g., TurboTax® products or services) via user devices to ask questions, raw online data associated with user generated content may be received as natural language text and may be collected by a data management system. TurboTax is one example, but other CQA systems may be provisioned for other applications. As the users step through the TurboTax interview pages, they can search self-help content or ask a question to seek an advice or address a problem encountered in TurboTax. TurboTax users may often prefer self-help to assisted measures and be able to find and apply their solution faster through self-help. TurboTax self-help content may include curated FAQs and TurboTax® AnswerXchange, a social community question-answering system (CQA) for generating help content.

Users may differ widely by their degree of domain expertise when they communicate with the CQA system, such as TurboTax® AnswerXchange. Both customers and non-customers may share questions and answers regarding particular topics. In one particular example, the questions may be broadly viewed as general topics that relate to products or services, or tax topics that are mixed with both general tax and tax product components. For example, self-help content in TurboTax is a combination of tax and product related topics. Tax related topics may be semantically similar to publications by the Internal Revenue Service (IRS) and/or by state tax authorities (e.g., "What is Alternative Minimum Tax (AMT)?"), for example. Product related topics may be specific to the product and may deal with pricing, choice of product version, and software issues, such as installation or e-filing (e.g., "How do I review my 2018 tax return?"), for example.

The user generated content (e.g., user question text) received by the CQA system may include indicators for text or topic classification. A related classified category may be detected in user text entry without having recorded clickstream samples from a particular user. Additionally, there may be spelling mistakes and ambiguous or incomplete text included a great amount of user input questions. In this case, the respective in-product user behaviors, such as answer frequency, clickstream data, and quality of contributions, can be key indicators of content type for classifying the ambiguous or incomplete text inputs. However, data collection and processing screen-to-screen transitions may be related to millions of customers who access the TurboTax® commercial website. The availability of data labeled with particular topics may be limited.

As used in this application, the "user generated content" may include but is not limited to "user input question" and/or "question text" in various embodiments described herein. The user input questions during the screen-to-screen transitions may be related to unseen text or unseen user behavior. The unseen text or unseen user behavior herein may be referred to the unlabeled text and user behavior.

The embodiments address a computer-centric and Internet-centric problem of classifying user input questions with unseen text or unseen user behavior into different classes and implement classification task with the built neural network system. The neural network system may be configured to process and classify the user questions associated with unseen text or unseen user behavior by initializing word embeddings and using pre-training clickstream embedding generation network. For example, character embedding may fit for misspelling words, emoticons, infrequent words, and/or new words included in user input questions. For questions with ambiguous text, embodiments described herein may use clickstream embedding representing user browsing behavior to disambiguate the question type.

The neural network system described herein may be built and trained with various functional deep learning models which may be embedded and stored in computer-readable medium with related computer program instructions operable to cause a computing system to perform operations of predicting text information into particular classes.

In some embodiments, the neural network system may be configured to operate as a binary deep learning text classifier to predict a first class and a second class associated with the received input questions with respective binary class labels. The present disclosure may utilize the deep learning neural network system by combing multiple Long Short-Term memory (LSTM) and Bi-LSTM word/character/clickstream based models operating between an input layer and an output layer of the neural network system.

The neural network system may predict class labels for input questions based on question text and available clickstreams related to user behavior. The neural network system may be configured to perform a first stage text classification to transform the input question text to real-number vectors and generate respective embeddings of character-based and word-based features. In some embodiments, the neural networks described herein may be configured to extract character-based features from the input question text through character embeddings, Bi-directional LSTM and a self-attention module. The neural networks described herein may be configured to extract word-based features from the input question text through word embeddings, Bi-directional LSTM and a self-attention module. The self-attention module may be configured to learn to attenuate irrelevant modalities while amplifying the most informative modalities to extract relevant context. In an embodiment, the present disclosure may employ a "zero shot learning" approach by classifying text with deep learning algorithms trained on text embeddings only to solve a tax/product classification task despite not having received sufficient number of click stream training examples of that task. For example, a tax-related class or category may be detected in user text entry without ever having recorded a click stream sample of that particular user.

In some embodiments, the neural networks described herein may be configured to classify text and available clickstreams by utilizing deep learning algorithms to train text embeddings and clickstream embedding separately. The neural networks may be configured to use a pre-trained LSTM neural network to extract clickstream features associated with user behavior and question text. Further, the neural network system may utilize a concatenation module to concatenate the extracted word-based features and character-based features along with the clickstream embeddings to form a representation vector indicative of user behavior and question text. The representation vector may be fed into a fully connected feed-forward network which is configured to predict different classes for the user input questions. In some embodiments, the output layer of the neural network system may provide binary class labels and/or numeric scores to the input questions based on the processing results.

Embodiments described herein improve the technical fields of natural language processing (NLP) for classifying text information and predicting classes for input questions. The improvements of the present disclosure as reflected in embodiments described herein may create a robust neural network system to classify user input questions with unseen text or unseen user behavior when performing prediction in real-time scenarios.

The present disclosure may take advantage of custom built character-based, word-based and clickstream embeddings in order to personalize content management tasks based on the observed clickstream data for the in-product user posting questions, searching or navigating relevant content. The present disclosure may provide a specific solution for the try-before-you-buy online applications (e.g., TurboTax Online applications). The present disclosure may be implemented with deep learning models which are implicitly optimized assimilating clickstream data in real time scenarios.

FIG. 1 illustrates an example computing system 100 that may be used to perform online user input question classification according to some embodiments of the present disclosure. System 100 may include an application server 120 (e.g., a server computing device 104) and a user device 130 (e.g., a client/user computing device) that may be communicatively connected to one another in a cloud-based or hosted environment by a network 110. Application server 120 may include a processor 121, a memory 122 and a communication interface for enabling communication over network 110. Application server 120 may include one or more applications 123 stored in memory 122 and executed by processor 121 for providing configured text classification functions, services or providing a website with particular services for users to visit. Applications 123 may include a practical application for implementing a neural network system 124 for text classification. The neural network system 124 may be one of components of the applications 123. Applications 123 may include a web application that provides a question and answer interface service that may be accessed by the user device 130 via a browser application 133. Further, memory 122 may store a neural network system 124, and other program modules which are implemented in the context of computer-executable instructions and executed by application server 120.

System 100 may include a database 125 coupled to or in communication with the application server 120 via network 110. Database 125 may be a shared remote database, a cloud database, or an on-site central database. Database 125 may receive instructions or data from and send data to application server 120 via network 110. Database 125 may store user input questions and related answers provided by the applications 123. Details related to building and training neural network system 124 will be described below.

User device 130 may include a processor 131, a memory 132, and a browser application 133. Browser application 133 may facilitate user interaction with application server 120 and may be configured to transmit information to and receive information from application server 120 via network 110. User device 130 may be any device configured to present user interfaces and receive inputs thereto. For example, user device 150 may be a smartphone, personal computer, tablet, laptop computer, or other device. Network 110 may be the Internet and/or other public or private networks or combinations thereof.

Application server 120 and user device 130 are each depicted as single devices for ease of illustration, but those of ordinary skill in the art will appreciate that application server 120, and/or user device 130 may be embodied in different forms for different implementations. For example, application server 120 may include a plurality of servers communicating with each other through network 110. Alternatively, the operations performed by application server 120 may be performed on a single server. In another example, a plurality of user devices 130 may communicate with application server 120. A single user may have multiple user devices 130, and/or there may be multiple users each having their own user device(s) 130. Users may access a social or commercial website (e.g., http://turbotax.intuit.com) to share their collective knowledge on a particular topic of interest via a browser application through user devices 130. The users may interact with a variety of standalone and/or online products or services (e.g., TurboTax® products or services) by commenting on questions and answers, voting answers up or down, and leaving feedback. TurboTax® products or services include but are not limited to different standalone TurboTax® applications, TurboTax® online or similar tax and finance online applications.

For example, some users may communicate with the CBA system (e.g., the TurboTax® AnswerXchange) while they are working on software that is utilized to prepare their tax returns. Such software may be used as standalone software or application running on a personal computer, laptop, tablet, mobile device, smartphone, etc. Alternatively, the software may be used as an online service that users interface with the TurboTax® AnswerXchange using, for example, a browser application. As a user steps through various TurboTax interviews or other prompt screens, the user can ask a question and/or view and search contextually relevant content via the TurboTax® AnswerXchange. Users may also contribute to the TurboTax® AnswerXchange by commenting on questions and answers, voting answers up or down, and leaving feedback, etc. In the TurboTax® AnswerXchange, a large number of answers to questions may originate from non-compensated "super users" that are selected by moderators based on answer frequency and quality of contributions.

The user questions may be collected based on user inputs while the users interact with application server 120 regarding various products or services (e.g., TurboTax® products or services) through user devices 130. Database 125 may store the user questions and communicate with application server 120 to facilitate user questions processing.

Questions submitted to websites or software programs may be formed as natural language text. Text elements may include words, phrases, sentences, and paragraphs, etc. Text elements may be preprocessed by tokenization, removing unnecessary punctuation, removing stop words, etc. and then may be combined into a large text corpus.

Figure 2:
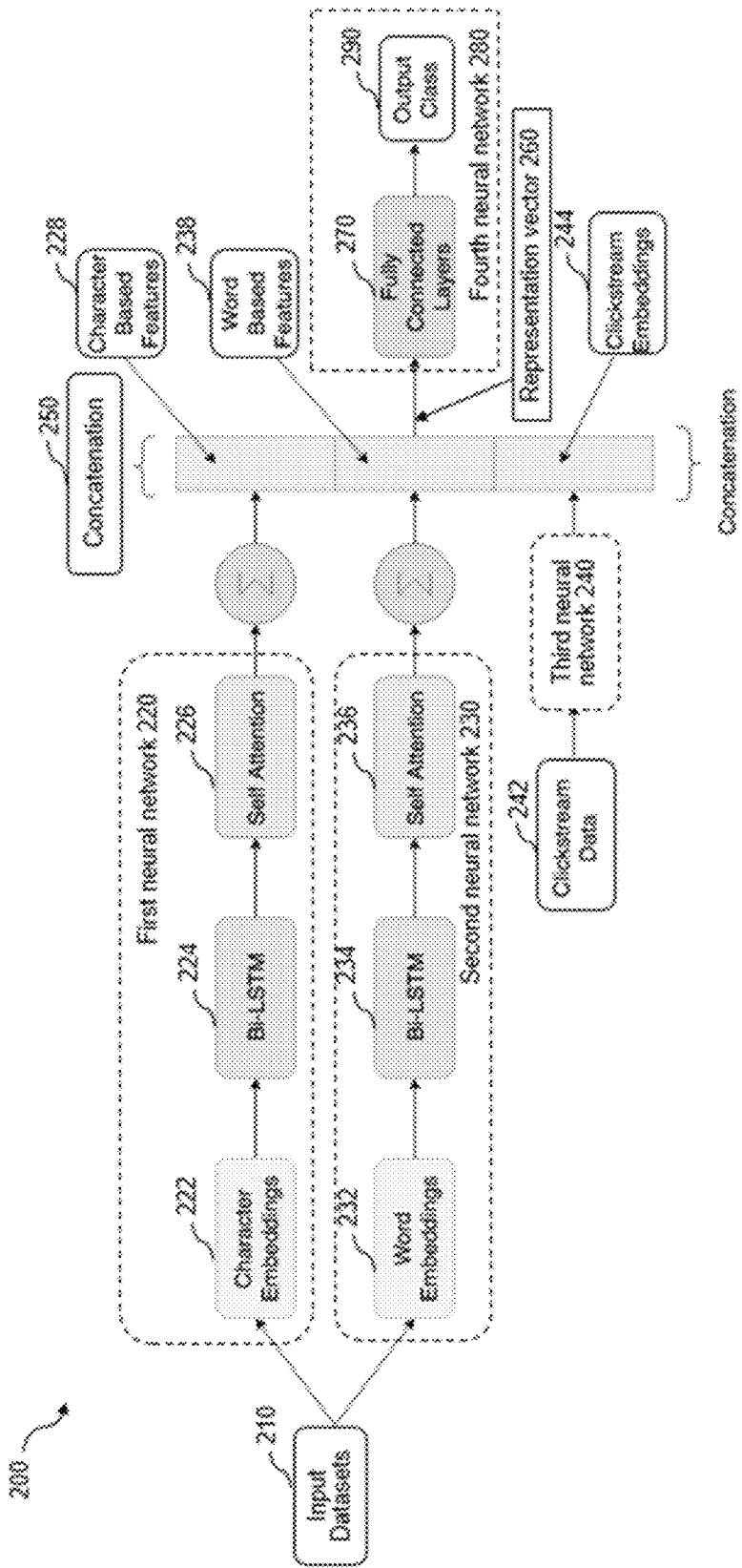
FIG. 2 shows a diagram of a neural network system configured to perform text classification of user input questions according to some embodiments of the present disclosure.

FIG. 2 is a block diagram of an example neural network system 200 that represents neural network system 124 in FIG. 1 and may be executed by an application server 120 to perform text classification of user input questions. The neural network system 200 may be configured as computer programs (e.g., software) executed on one and more computers, in which the systems, model components, processes, and embodiments described below can be implemented.

In some embodiments, the neural network system 200 may include at least a first neural network 220, a second neural network 230, a third neural network 240, a concatenation module 250 and a fourth neural network 280. The neural network system 200 may be configured to classify the received input datasets and output a class of tax-related questions and a class of product-related feature questions. The neural network system 200 may be configured to receive input datasets 210 (e.g., question text) associated with user questions. The input datasets 210 may include unseen text or unseen user behavior when predicting in real-time scenarios. To generate a classification model for classifying user questions, the input datasets 210 may include non-normalized user question text and related clickstream data and may be labeled with related features. The data entered into an input layer of the neural network system may include features of user input questions, such as search query, question title, question detail, and clickstream modality, etc.

The neural network system 200 may combine multiple Convolutional Neural Networks (CNNs), such as Long Short-Term Memory (LSTM) and bidirectional LSTM (Bi-LSTMs) models to perform word-based, character-based, clickstream embeddings of the input datasets 210. For example, the first neural network 220 may be configured to receive the input datasets 210 from the first layer of the system 200 and to be trained to extract character-based features 228 from the input datasets 210. The second neural network 230 may be configured to receive the input datasets 210 from the first layer of the system 200 and be trained to extract word-based features from the input datasets 210. The third neural network 240 may be configured to receive clickstream data 242 and be trained to extract embeddings of clickstream features from a sequence of clickstream data of visited pages related to user input questions. For example, clickstream data 242 may include a sequence of screen identifiers (ID) of TurboTax® webpages the user visited while submitting questions.

Further, the neural network system 200 may utilize a concatenation module 250 to concatenate the clickstream embeddings, the word-based features, and the character-based features of the input datasets 210 to form a representation vector indicative of the user behavior and question text. The representation vector 260 may be fed to fully connected layers 270 of the fourth neural network 280 which is configured to predict and output classes 290 with binary class labels and/or numeric scores for respective questions.

Each process described herein is illustrated as a process of operations in a logical and functional flow graph, which represent a sequence of operations that can be implemented in hardware, software, or a combination in the above described systems. Thus, the recited operations described in FIGS. 3-8 may be performed under control of one or more processors configured with computer-executable instructions. The order in which the operations are described is not intended to be construed as a limitation, and any number of the described operations can be combined in any order and/or in parallel to implement the process.

Generally, computer-executable instructions include programs, objects, models, components, data structures, and the like that perform particular functions or implement particular data types. The computer-executable instructions may be stored in a memory communicatively coupled to a processor and executed on the processor to perform one or more methods described herein. The above discussion may apply to any computing device/system and processes illustrated and/or described herein.

Figure 3:
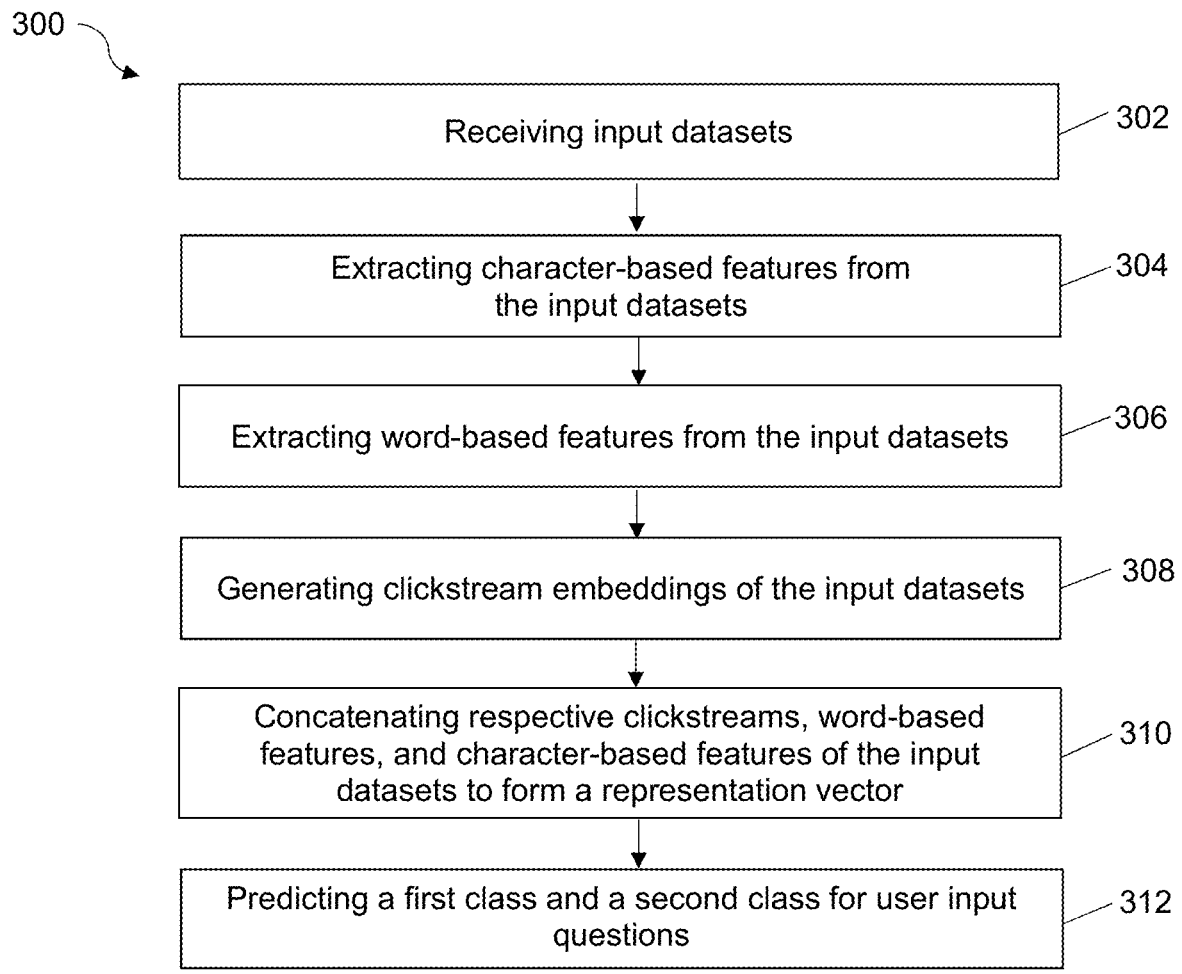
FIG. 3 is a flowchart illustrating an example process configured to perform question classification according to some embodiments of the present disclosure.

FIG. 3 is a flowchart illustrating an example process configured to perform user question classification according to some embodiments.

To generate a classification model for classifying user questions, data to be processed may be provided to include non-normalized user question text and related clickstream data of last n clicks/pages. Each input dataset 210 may be labeled to include multiple features of respective user questions. In text processing, question text may represent discrete and categorical features. The labeled dataset associated with a particular question may include various attributes or features. The clickstream data 242 associated with the user questions may represent features of user behaviors when users ask the related questions. The related clickstream data 242 may include page identifier (ID), page title, time spent on page for the last n clicks on visited pages, etc. A page ID may be one-hot encoded vector. Time spent on each page may be passed as a continuous domain feature. A page title may be included in the question text and be processed for word extraction and summing word embeddings through the neural network system 200 using the same methods described below. For example, the text of the page title may include t words. The pre-trained character and word embeddings may be used for each of those t words to generate corresponding title embeddings. The corresponding title embeddings may be aggregated using different methods to form one vector representation of the title. The methods may include averaging title embeddings, performing self-attention based weighted average or concatenation on title embeddings, for example.

At 302, the application server 120 may receive input datasets associated with user input questions from a database 125. The input datasets 210 (e.g., question text) may include text of the user input questions submitted to a particular online product and/or an online service website. The user questions may be read and labeled with a wide variety of features to form input datasets 210. For example, the user questions may be read and labeled before being fed into one or more neural networks or deep learning models. The input datasets 210 may be transformed into machine readable vectors.

By referring to FIG. 2, the input datasets 210 may be provided with word vectors corresponding to a text corpus with a number of words. The neural network system 200 may perform feature extraction by mapping textual data to real valued vectors using any type of word embedding algorithms, such as Global Vectors (GloVe), or fastText, etc. In some embodiments, GloVe algorithm may be used to build semantic word embeddings and vectors for the question text.

At 304, a first neural network 220 may be trained to extract character-based features from the input datasets 210. The first neural network 220 may include multiple layers of bidirectional LSTM (Bi-LSTMs) models which are trained to learn model weights to process the input datasets 210 for extracting character-based features. The first neural network 220 may include a model 222 for performing character embeddings and a multiple layer BI-LSTM model. As illustrated in FIG. 2, the first neural network 220 may include a self-attention model 226. Details related to an operational process of the first neural network 220 will be described in FIG. 4 below.

At 306, a second neural network 230 may be trained to extract word-based features from the input datasets 210. The second neural network 230 may include multiple layers of bidirectional LSTM (Bi-LSTMs) models which are trained to learn model weights to process the input datasets 210 for extracting word-based features. Details related to an operational process of the first neural network 220 will be described in FIG. 5 below.

At 308, a third neural network 240 may receive clickstream data 242 from the database 125. The third neural network 240 may be a pre-trained Siamese network including multiple layers of LSTM models. The application may train the third neural network 240 with clickstream data 242 to generate clickstream embeddings 244 from the clickstream data 242. Details related to an operational process of the first neural network 220 will be described in FIG. 7 below.

At 310, the application server may execute a concatenation module 250 which may be configured to concatenate the word-based features 238, the character-based features 228 of the input datasets 210 and respective clickstream embeddings 244 to form a representation vector 260. The representation vector 260 may represent the input question text and user behavior features associated with the input questions. For example, third neural network 240 with the LSTM model that operates on clickstream data 242 may return a clickstream embedding 244 as a n1-dimensional vector. Similarly, the first neural network 220 with the character Bi-LSTM model 224 that operates on character embeddings may return a n2-dimensional vector as an output of the character-based features 228, which is a representation of the input question by considering semantic relations at character level. Likewise, the second neural network 230 with the word Bi-LSTM model 234 that operates on word embeddings may return a n3-dimensional vector as an output of the word-based features 238, which is a representation of the input question by considering semantic relations at word level. The concatenation module 250 may operate to concatenate the outputs of all the three LSTM models and return the representation vector 260 with a total number of (n1+n2+n3) dimensions.

At 312, the application server may feed the representation vector 260 to a fourth neural network 280 which may be configured to predict a plurality of classes for the representation vector 260. In some embodiments, the fourth neural network 280 may be a feed-forward network which is trained to predict output classes 290 based on the representation vector 260 and available clickstream and classify the user input questions into a plurality of classes based on the predefined business or user need. For example, the neural network 280 may operate on representation vector 260 as a vanilla feed-forward network (e.g., multi-layer perceptron). Essentially, the neural network 280 may include multiple hidden layers and 1 output neuron at the end that outputs the predicted class. The number of hidden layers and number of neurons in each hidden layer may be tuned while training the model. Based on the classification result, the application server may assign target labels associated with respective classes to respective input questions. In an embodiment, the fourth neural network 280 may predict output classes 290 based on the representation vector 260 and available clickstream and classify the user input questions into 2 classes, such as a tax-related class and a product-related class. The application server 130 may assign a first label as a target tax-related label to respective tax-related questions and a second label as a target product-related label to respective product-related questions.

Figure 4:
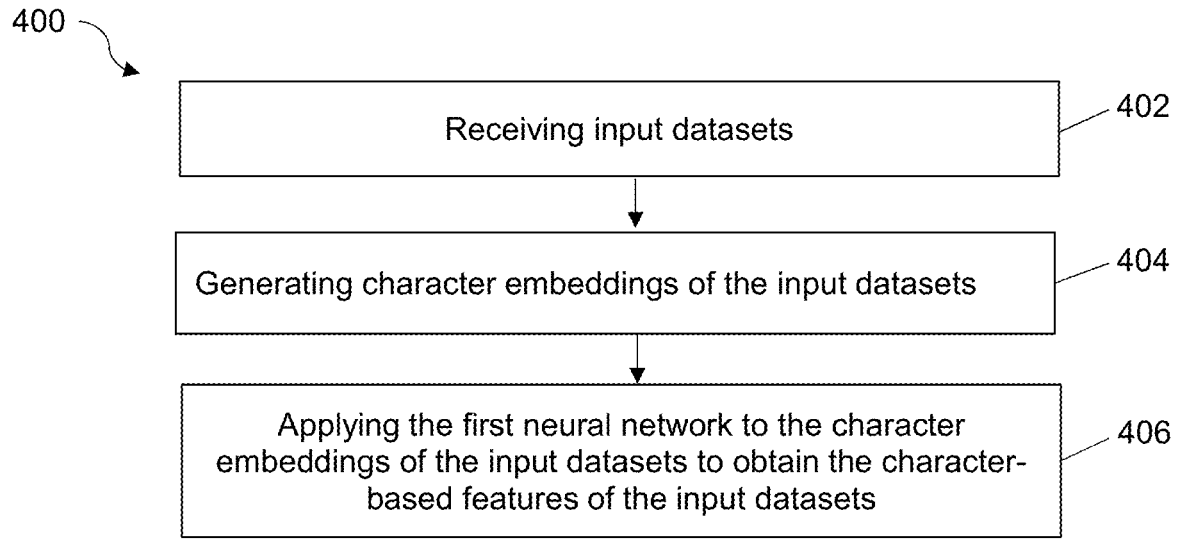
FIG. 4 is a flowchart illustrating an example process configured to extract character-based features from question text according to some embodiments of the present disclosure.
Figure 5:
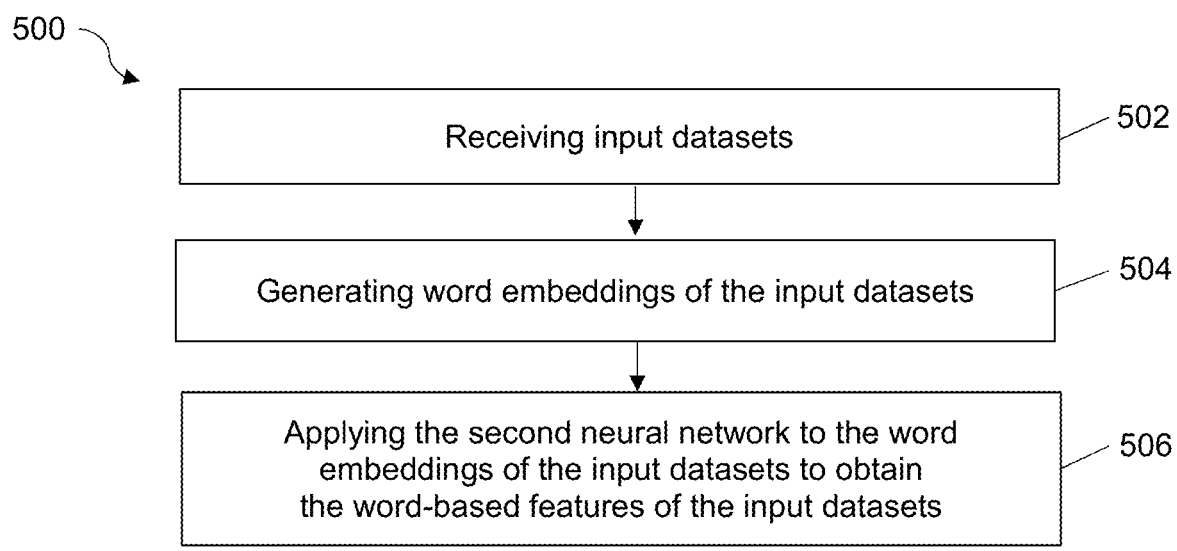
FIG. 5 is a flowchart illustrating an example process configured to extract word-based features from question text according to some embodiments of the present disclosure.

FIGS. 4-5 provide details of training and utilizing neural networks to perform character embedding and word embedding. Word embedding may be capable of capturing context of a word in a document, semantic and syntactic similarity, relation with other words, etc. Question text may be transformed and mapped into a meaningful computer readable vector. In some embodiments, GloVe algorithm for word representation may be used for initializing word embeddings to convert words to numerical word vectors. GloVe algorithm may be used to construct an explicit word-context or word co-occurrence matrix using statistics across the whole question text corpus, which may result in generally accurate embeddings.

FIG. 4 is a flowchart illustrating an example process 400 configured to extract character-based features from the input datasets 210 (e.g., question text) utilizing a first neural network 220. The first neural network 220 may include a model 222 to perform character embeddings and a multiple layer BI-LSTM model to extract character-based features.

At 402, the input datasets 210 may be fed into the first neural network 220.

At 404, the character embedding model 222 may generate character embeddings of the input dataset 210. In some embodiments, the character embedding model 222 may generate character embeddings as an embedding matrix in the form of a lookup table based on the input dataset 210. The number of rows of a lookup table may equal to all different characters in training data. That is, 26 characters of English language plus special characters may appear in the training data. For example, there may be d columns in the embedding matrix. Each row may be a d-dimensional vector which represents the character embedding for character corresponding to that row. They may be trained end-to-end with the Bi-LSTMs model and the tax vs product classification loss of the model may be back propagated all the way back to the character embedding matrix, and the loss may be used to train the character embeddings 222 of the input dataset 210.

At 406, the multiple layers of bidirectional LSTM (Bi-LSTMs) model 224 may be trained to learn model weights to process the character embeddings of the question text to extract character-based features of user input question text. Character embedding 222 may fit for misspelling words, emoticons, infrequent words, and/or new words. The first algorithm implemented by the first neural work 220 may be trained on the non-normalized text data in order to be able to assimilate the observed user inputs, such as misspelled and abbreviated text, vernacular language, etc. The first algorithm may be able to be trained end-to-end, without manual intervention.

As illustrated in FIG. 2, the first neural network 220 may include a self-attention model 226 which is configured to learn to attenuate irrelevant modalities while amplifying the most informative modalities to extract relevant context. Self-attention mechanism may be used to improve model performance in terms of obtaining aggregated representations of any input text by focusing on different parts of the text differently. Self-attention mechanism may work at a "token" level. For example, when self-attention is applied for a word-level processing, these tokens are individual words of the text sentence. When self-attention is applied for a character-level processing, these tokens are individual characters of the text sentence.

FIG. 5 is a flowchart illustrating an example process configured to extract word-based features from question text. As illustrated in FIG. 2, the second neural network 230 may include a word embedding model 232 to perform word embeddings and a multiple layer BI-LSTM model 234.

At 502, the input datasets 210 may be fed into the second neural network 230.

At 504, a word embedding model 232 may be configured to train and generate word embeddings of the input dataset 210. For example, a model of Global Vectors (GloVe) may be used to transform the question text into word embedding vectors.

At 506, the second neural network 230 may be constructed with multiple layers of bidirectional LSTM (Bi-LSTMs) models. The multiple layers of bidirectional LSTM (Bi-LSTMs) models 234 can be trained to learn model weights to process the word embeddings of the question text to extract word-based features of user input questions.

Figure 6:
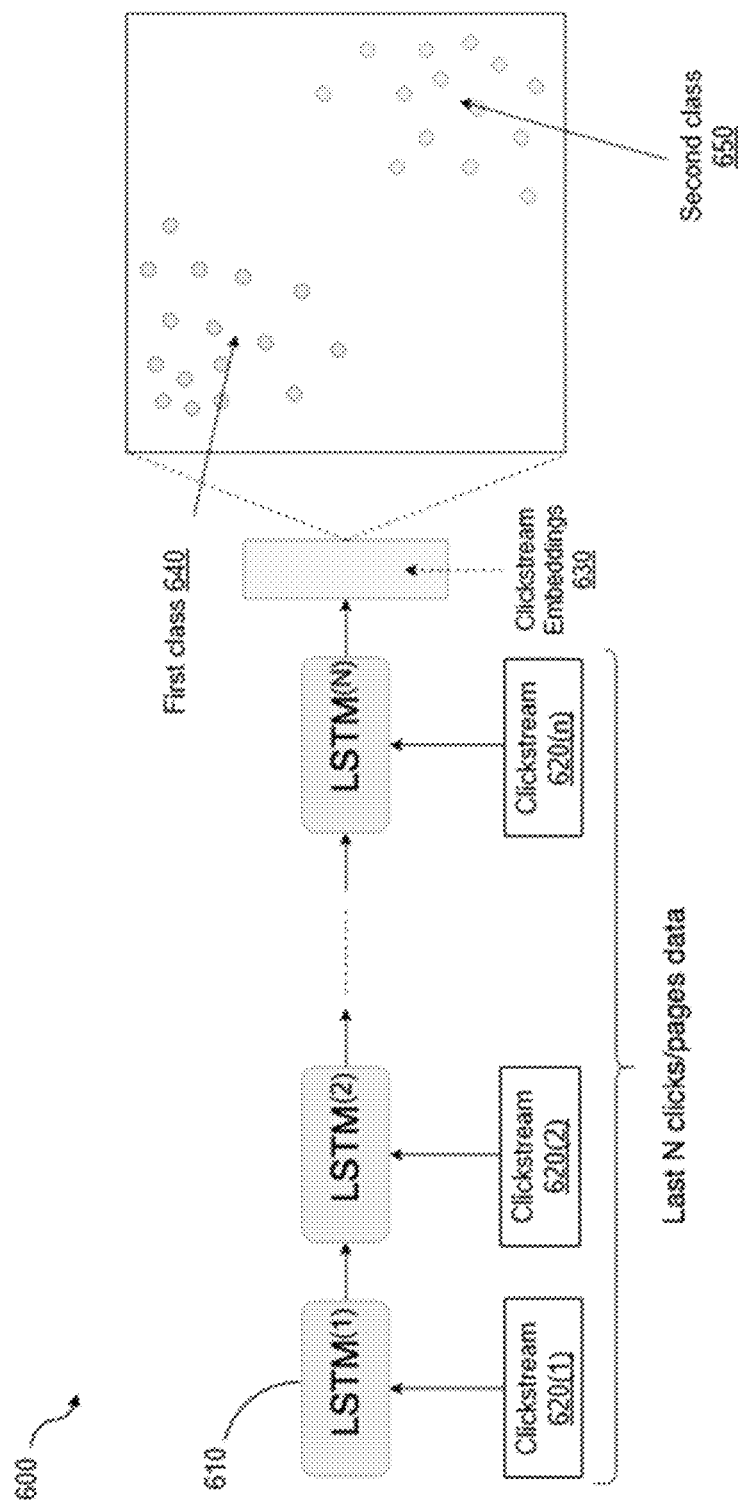
FIG. 6 shows a block diagram of a neural network structure configured to preform clickstream embeddings of clickstream data related to user input questions according to some embodiments of the present disclosure.

FIG. 6 is a block diagram of a neural network structure 600 configured to preform clickstream embeddings of clickstream data related to user input questions according to some embodiments. In one embodiment, the third neural network 240 illustrated in FIG. 2 may be constructed as a neural network shown in FIG. 6. FIG. 6 is a block diagram of a LSTM-based pre-trained Siamese network 610 configured to learn and generate clickstream embeddings of last N clicks/pages of clickstream data (e.g., clickstreams) 620[1]-620[n] of user input questions. The LSTM-based pre-trained Siamese neural network 610 may include a plurality of LSTM neural network layers, with each of the LSTM layers including one or more LSTM memory blocks. Each LSTM memory block may include one or more cells that each may include an input gate, a forget gate, and an output gate that allow the cell to store previous activations generated by the cell as a hidden state for use in generating a current activation or to be provided to other components of the LSTM neural network.

Figure 7:
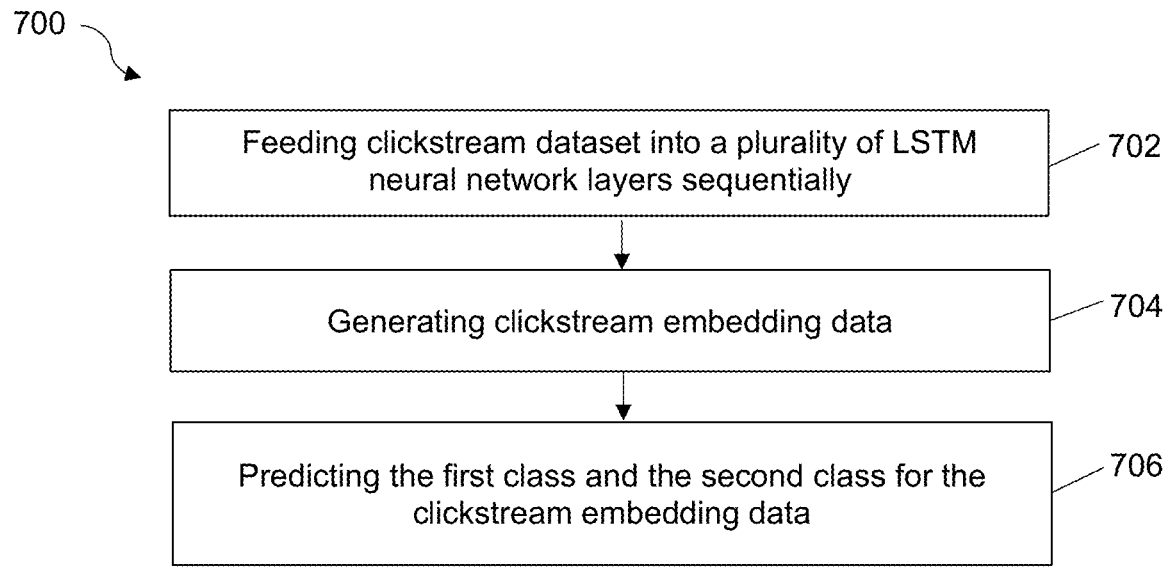
FIG. 7 is a flowchart illustrating an example process configured to train a neural network to generate clickstream embedding features of the question text according to some embodiments of the present disclosure.

FIG. 7 is a flowchart illustrating an example process performed by a neural network configured to generate clickstream embeddings features of the input question text according to some embodiments. The pre-trained Siamese network 610 represents a third neural network 240 as illustrated in FIG. 2. By referring to FIG. 6, the process 700 shows operations performed by the third neural network 240 which may be trained to generate clickstream embeddings 244 of clickstream data 242 associated with the user input questions.

In some embodiments, the third neural network 240 may be a pre-trained Siamese network 610 with an algorithm implemented by multiple Long Short-Term Memory (LSTM) to generate the clickstream embeddings associated with user entry behavior associated with the user input questions. The Siamese network is a learning framework that may be applied to any type of networks. For example, it may be a convolutional network when inputs are images. It may be a recurrent network such as LSTM when input is language or time series data.

The Siamese network may be used to generate embeddings (d-dimensional vectors) for inputs belonging to different classes. In some embodiments, if the system includes 2 classes of the input questions (e.g., tax-related and product-related classes), the trained Siamese network may generate different embeddings for input clickstreams belonging to those 2 different classes. The output of a Siamese network may be used for simple classification. The Siamese network may be applied to generate different embeddings for a number of classes depending on user or business need. In some embodiments, the output embeddings may be used as features in further layers of the network.

At 702, the system 200 may sequentially feed n clickstream datasets 620[1]-620[n] into multiple LSTM neural network layers of the pre-trained Siamese network 610.

At 704, each clickstream 620[1]-620[n] may sequentially pass through the pre-trained Siamese network including multiple LSTM neural network layers 620[1]-610[n] to generate corresponding clickstream embeddings 630.

At 706, the LSTM-based Siamese network may classify and learn to project the clickstream embeddings 630 for patterns of same class together and patterns of different classes far from each other. In an embodiment, As shown in FIG. 6, the pre-trained Siamese neural network 610 may be configured to learn to project the clickstream embedding data 630 into two classes. A first class click streams 640 may be related to the tax-related clickstreams. A second class click streams 650 may be related to product-related clickstreams.

The pre-trained Siamese network 610 may determine a similarity measure of the first class clickstreams 640 and the second class clickstreams 650. During the training, different variables may be received by a contrastive loss function of equation (1) and be used to measure a similarity of between two classes. Implementations can include one or more of the following features.

$$L(S_1, S_2, l) = l \cdot d(S_1, S_2)^2 + (1-l) \cdot \max(m - d(S_1, S_2), 0)^2 \qquad (1)$$

wherein, $S_1$ and $S_2$ are 2 clickstream embedding outputs of the LSTM neural network for the first class clickstreams 640 and the second class clickstreams 650. Based on the equation (1), a variable l equal to "1" means two clickstreams belong to the same class. A variable l equal to "0" means two clickstreams belong to different classes. A variable m is the margin by which these clusters or classes are to be separated. Two classes of clickstreams may include a binary label, for example, "0" for tax-related clickstreams and "1" for product-related clickstreams.

For each class i, the algorithm to learn clickstream embeddings may define center $c_i$, and a radius $r_i$ such that a threshold percentage of points of class i lie within the defined circle. the threshold percentage may be adjustable.

In one embodiment, the threshold percentage may be adjustable be defined to be 95%. The center $c_i$ may be defined as a vector representing each class. For example, there may be q points belonging to class 1. The clickstream embeddings for each of those q points may be obtained from the Siamese network. The center can be computed by taking average of clickstream embeddings for all the q points. Similarly, the center $c_i$ may be obtained by averaging the clickstream embeddings of all data points belonging to each of those classes. Euclidean distance metric may be used to compare the vector of the center $c_i$ with the respective vectors of clickstream embedding outputs $S_1$ and $S_2$.

During prediction, the clickstream embeddings of input dataset 210 may be generated by passing the clickstreams through the LSTM layers. If the clickstream embeddings lie within 95% circle of any class, they may be used further as they are generated. If the clickstream embeddings do not lie within 95% circle of any class, the network may be configured to compute the distance of embedding e from each class center c which is denoted by $d_i$. The network may be configured to compute the new embedding e' for input data as follows, to be used later.

$$\alpha_i = \frac{\exp(1/d_i)}{\sum_i \exp(1/d_i)} \quad (2)$$

In some embodiments, the present disclosure may employ a "zero shot learning" approach by classifying text with deep learning algorithms trained on text embeddings only to solve a tax/product classification task despite not having received sufficient number of click stream training examples of that task. Zero shot learning is a way that the model may handle previously unseen input values as well. For example, a particular clickstream behavior at run time may be totally new and no clickstream behavior of that type has been present in the training dataset. The model may be able to handle such cases as well. In some embodiments, tax category can be detected in user text entry without ever having recorded a clickstream sample of that particular user before.

In some embodiment, to solve the problem of limited labeled data availability, the disclosed solution may employ clickstream embeddings combined with the "zero shot learning" approach. The details have been described as illustrated in FIG. 2.

Embodiments described herein may be utilized in managing a CBA system including social-based questions and answers based on the neural network system 200 described in FIG. 2.

By referring to FIG. 1, the application server 120 may include a web application 123 stored in memory 122 and executed by processor 121 for managing a CBA system including social-based questions and answers based on the neural network system architecture described in FIG. 2. Applications 123 may include a web application for implementing a trained neural network system and various functional machine learning models to perform various functions through online software product services. Application 123 may provide particular online software product services for users to access via the user devices 130 through the network 110. The instructions or algorithms of the trained neural network system may be validated and transformed to be stored in computer-readable medium with related computer program instructions operable to cause the application server 120 and the user device 130 of the computing system 100 to perform operations, such as classifying text information into particular classes based on commercial or user need. For example, the application 123 may conduct processes including receiving question/inquiry text input from users, processing and classifying the text input into variety of classes, presenting the classification results or presenting a webpage related to answers to the input question on the user interface of user devices.

Figure 8:
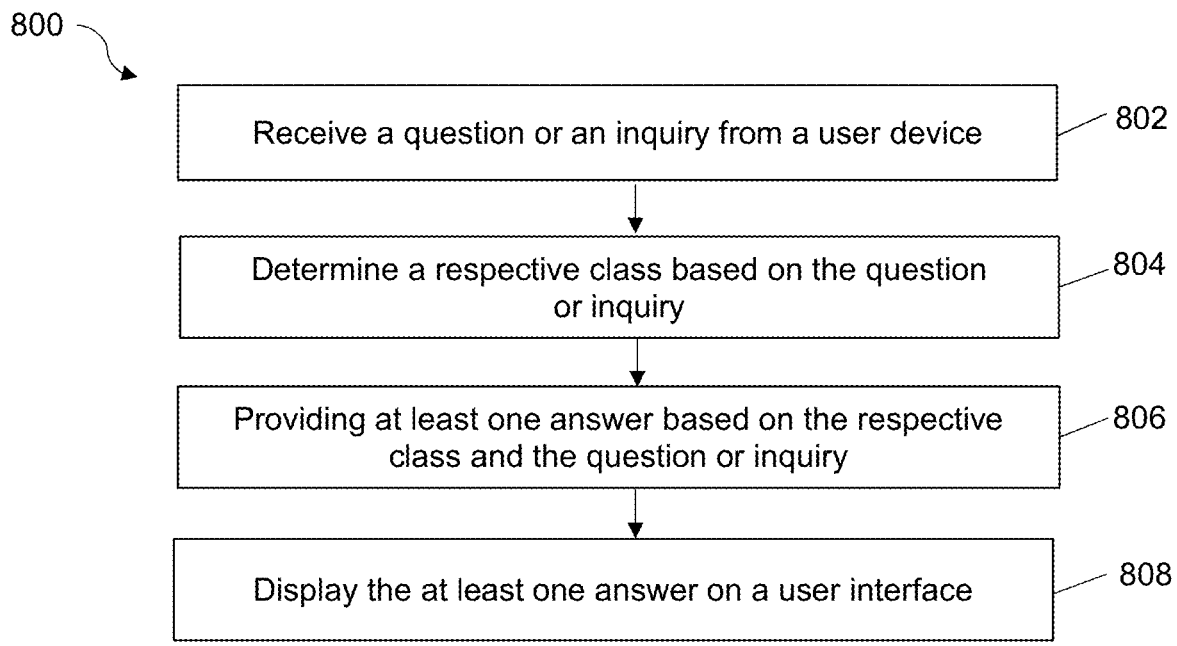
FIG. 8 is a flowchart illustrating an example process to utilize a neural network system for text classification in a practical application according to some embodiments of the present disclosure.

FIG. 8 is a flowchart illustrating an example process to utilize a neural network system for text classification in a practical application according to some embodiments of the present disclosure.

At 802, the application server 121 may receive user text input, such as inquiries and questions regarding products and services from the graphic user interface of the user devices 130 via a CBA system hosted on a commercial website. The application server 121 may route the inquiries and questions to appropriate personnel on customer support lines of particular online products or services. As the users go through the pages of the website, user input question or inquiry text and the associated clickstream data may be collected and stored by a data management system coupled to or in communication with the application server 121.

At 804, the user input question/inquiry text and the associated clickstream data may be input to a built model (e.g., trained neural network system) of the application server to predict whether the input questions are related to one of different classes. For example, The system may be configured to define the first class as tax-related questions and a second class as product-related questions. The application server may predict whether the input question/inquiry is tax-related or product-related, i.e. the user intent. The application server may assign binary labels and/or numerical scores to the predicted classes for respective input questions or inquires.

At 806, the application 123 may provide at least one answer or suggested information associated with the respective class based on the user question or inquiry. Based on the predicted class of the user input question/inquiry, the input question/inquiry may be routed to appropriate online assistants on commercial customer support lines of commercial online products or services.

At 808, users may receive the at least one answer or suggested information displayed on a user interface via the browser application 133 executed on the user device 130. The displayed answer or suggested information may include one or more hyperlinks associated to webpages which include most of the relevant information for answering the user input question/inquiry.

Figure 9:
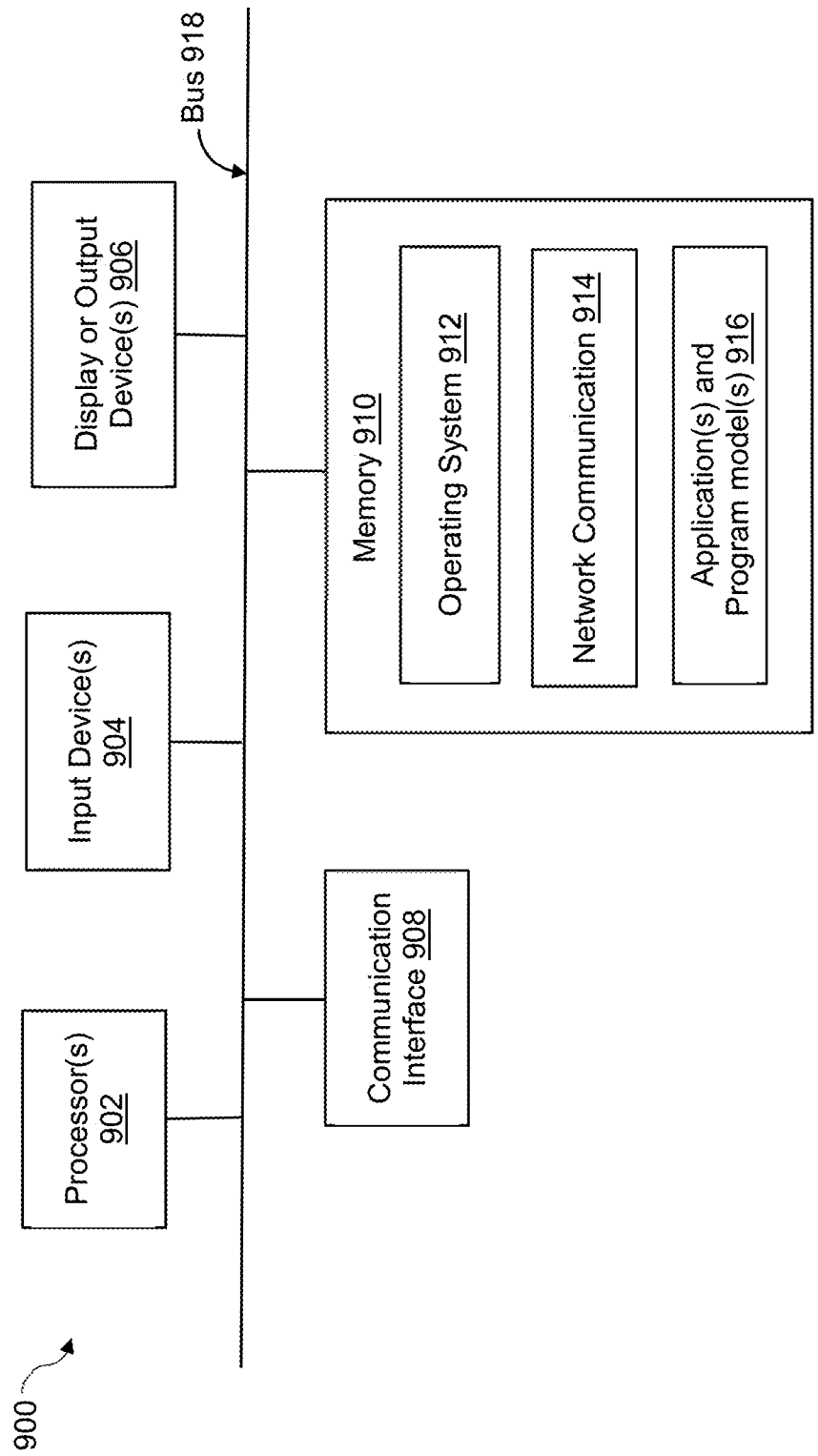
FIG. 9 is a block diagram of an example computing device according to some embodiments of the present disclosure.

FIG. 9 is a block diagram of an example computing device 900 that may be utilized to execute embodiments to implement processes including various features and functional operations as described herein. For example, computing device 900 may function as application server 110, user device 130 or a portion or combination thereof in some embodiments. The computing device 900 may be implemented on any electronic device to execute software applications derived from program instructions for neural network system 124 and 200 as illustrated in FIGS. 1-2, and may include but is not limited to personal computers, servers, smart phones, media players, electronic tablets, game consoles, email devices, etc. In some implementations, the computing device 900 may include one or more processors 902, one or more input devices 904, one or more display or output devices 906, one or more communication interfaces 908, and memory 910. Each of these components may be coupled by bus 818, or in the case of distributed computer systems, one or more of these components may be located remotely and accessed via a network.

Processor(s) 902 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

Input device 904 may be any known input device technology, including but not limited to a keyboard (including a virtual keyboard), mouse, track ball, and touch-sensitive pad or display. To provide for interaction with a user, the features and functional operations described in the disclosed embodiments may be implemented on a computer having a display device 906 such as a CRT (cathode ray tube) or LCD (liquid crystal display) monitor for displaying information to the user and a keyboard and a pointing device such as a mouse or a trackball by which the user can provide input to the computer. Display device 906 may be any known display technology, including but not limited to display devices using Liquid Crystal Display (LCD) or Light Emitting Diode (LED) technology.

Communication interfaces 908 may be configured to enable computing device 800 to communicate with other another computing or network device across a network, such as via a wired connection, a wireless connection, or a combination of wired and wireless connections. For example, communication interfaces 908 may include an Ethernet interface, an optical interface, a coaxial interface, an infrared interface, a radio frequency (RF) interface, a universal serial bus (USB) interface, a Wi-Fi interface, a cellular network interface, or the like.

Memory 910 may be any computer-readable medium that participates in providing computer program instructions and data to processor(s) 902 for execution, including without limitation, non-volatile storage media (e.g., optical disks, magnetic disks, flash drives, etc.), or volatile media (e.g., SDRAM, ROM, etc.). Memory 910 may include various instructions for implementing an operating system 912 (e.g., Mac OS®, Windows®, Linux). The operating system may be multi-user, multiprocessing, multitasking, multithreading, real-time, and the like. The operating system may perform basic tasks, including but not limited to: recognizing input from input device 904; sending output to display device 906; keeping track of files and directories on memory 910; controlling peripheral devices (e.g., disk drives, printers, etc.) which can be controlled directly or through an I/O controller; and managing traffic on bus 918. Bus 918 may be any known internal or external bus technology, including but not limited to ISA, EISA, PCI, PCI Express, NuBus, USB, Serial ATA or FireWire.

Network communications instructions 914 may establish and maintain network connections (e.g., software applications for implementing communication protocols, such as TCP/IP, HTTP, Ethernet, telephony, etc.).

Application(s) and program models 916 may include software application(s) and different functional program modules which are executed by processor(s) 902 to implement the processes described herein and/or other processes. The program modules may include but not limited to software programs, objects, components, data structures that are configured to perform particular tasks or implement particular data types. The processes described herein may also be implemented in operating system 912.

Communication between various network and computing devices may be facilitated by one or more application programming interfaces (APIs). APIs of system 900 may be proprietary and/or may be examples available to those of ordinary skill in the art such as Amazon® Web Services (AWS) APIs or the like. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call.

The features and functional operations described in the disclosed embodiments may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

The described features and functional operations described in the disclosed embodiments may be implemented in a computer system that includes a back-end component, such as a data server, or that includes a middleware component, such as an application server or an Internet server, or that includes a front-end component, such as a user computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user computing devices and application servers. A user or client computing device and server may generally be remote from each other and may typically interact through a network. The relationship of client computing devices and server may arise by virtue of computer programs running on the respective computers and having a client-server relationship to each other.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method implemented by a computing system, the computing system comprising one or more processors and one or more computer-readable storage devices storing computer-executable computer instructions, the method comprising executing the instructions thereby causing the computing system to perform operations comprising:
receiving input datasets associated with user input questions from a database, the input datasets comprising question text of the user input questions;
extracting, through a first neural network, character-based features from the input datasets;
extracting, through a second neural network, word-based features from the input datasets;
generating clickstream embeddings of clickstream data;
concatenating respective clickstream embeddings, the word-based features, and the character-based features of the input datasets to form a representation vector indicative of the question text and related user behavior; and
predicting, based on the representation vector through a fourth neural network, a first class and a second class of respective user input questions.

2. The method of claim 1, wherein the instructions are further operable to cause the one or more processors to perform:
assigning a first target class label to the first class of the questions; and
assigning a second target class label to the second class of the questions.

3. The method of claim 1, wherein extracting character-based features from the input datasets further comprises:
generating character embeddings of the input datasets; and
applying the first neural network to the character embeddings of the input datasets to obtain the character-based features of the input datasets.

4. The method of claim 1, wherein extracting word-based features from the input datasets further comprises:
generating word embeddings of the input datasets; and
applying the second neural network to the word embeddings of the input datasets to obtain the word-based features of the input datasets.

5. The method of claim 4, wherein the word embeddings of the input datasets are initialized by applying a model of Global Vectors (GloVe) to transform the question text into word embedding vectors.

6. The method of claim 1, wherein generating the clickstream embeddings of the clickstream dataset further comprises:
feeding the clickstream datasets into a plurality of LSTM neural network layers;
generating clickstream embedding data; and
predicting, based on a first predefined class vector and a second predefined class vector through a pre-trained Siamese network, the first class and the second class associated with the clickstream embedding data.

7. The method of claim 6, wherein the clickstream datasets are collected from previous clicks on respective visited pages related to the user input questions and wherein the clickstream datasets comprise a sequence of screen identifiers of the visited pages.

8. The method of claim 1, wherein the first neural network and the second neural network each include a Bi-directional Long Short-Term Memory (Bi-LSTM) neural network.

9. The method of claim 1, wherein the first neural network and the second neural network each include a self-attention module.

10. The method of claim 1, wherein the fourth neural network is a feed-forward network.

11. A computing system, comprising:
one or more processors; and
one or more computer-readable storage devices storing computer-executable instructions, the instructions operable to cause the computing system to perform operations comprising:
receiving input datasets associated with user input questions from a database, the input datasets comprising question text of the user input questions;
extracting, through a first neural network, character-based features from the input datasets;
extracting, through a second neural network, word-based features from the input datasets;
generating clickstream embeddings of clickstream data;
concatenating respective clickstream embeddings, the word-based features, and the character-based features of the input datasets to form a representation vector indicative of the question text and related user behavior; and
predicting, based on the representation vector through a fourth neural network, a first class and a second class of respective user input questions.

12. The computing system of claim 11, wherein the instructions are further operable to cause the one or more processors to perform:
assigning a first target class label to the first class of the questions; and
assigning a second target class label to the second class of the questions.

13. The computing system of claim 11, wherein extracting character-based features from the input datasets further comprises:
generating character embeddings of the input datasets; and
applying the first neural network to the character embeddings of the input datasets to obtain the character-based features of the input datasets.

14. The computing system of claim 11, wherein extracting word-based features from the input datasets further comprises:
  generating word embeddings of the input datasets; and
  applying the second neural network to the word embeddings of the input datasets to obtain the word-based features of the input datasets.

15. The computing system of claim 14, wherein the word embeddings of the input datasets are initialized by applying a model of Global Vectors (GloVe) to transform the question text into word embedding vectors.

16. The computing system of claim 11, wherein generating the clickstream embeddings of the clickstream datasets further comprises:
  feeding the clickstream datasets into a plurality of LSTM neural network layers;
  generating clickstream embedding data; and
  predicting, based on a first predefined class vector and a second predefined class vector through a pre-trained Siamese network, the first class and the second class associated with the clickstream embedding data.

17. The computing system of claim 16, wherein the clickstream datasets are collected from previous clicks on respective visited pages related to the user input questions and wherein the clickstream datasets comprise a sequence of screen identifiers of the visited pages.

18. The computing system of claim 11, wherein the first neural network and the second neural network each include a Bi-directional Long Short-Term Memory (Bi-LSTM) neural network; and the first neural network and the second neural network each include a self-attention module.

19. The computing system of claim 11, wherein the fourth neural network is a feed-forward network.

20. A method implemented by a computing system, the computing system comprising one or more processors and one or more computer-readable storage devices storing computer-executable computer instructions, the method comprising executing the instructions thereby causing the computing system to perform operations comprising:
  receiving input datasets associated with user input questions from a database, the input datasets comprising input datasets of the user input questions;
  extracting character-based features from the input datasets by utilizing a first neural network;
  extracting word-based features of from the input datasets by utilizing a second neural network;
  extracting respective clickstreams from clickstream data to generate clickstream datasets;
  applying a pre-trained Siamese network with the clickstream datasets to generate clickstream embeddings of the clickstream data;
  concatenating respective clickstream embeddings, the word-based features, and the character-based features of the input datasets to form a representation vector indicative of the question text and related user behavior;
  predicting, based on the representation vector through a fourth neural network, a first class and a second class of respective user input questions; and
  assigning a first target class label and a second target class label to respective user input questions.

* * * * *